(12) United States Patent
McMurry et al.

(10) Patent No.: US 9,838,483 B2
(45) Date of Patent: Dec. 5, 2017

(54) METHODS, SYSTEMS, AND COMPUTER READABLE MEDIA FOR A NETWORK FUNCTION VIRTUALIZATION INFORMATION CONCENTRATOR

(71) Applicant: Oracle International Corporation, Redwood Shores, CA (US)

(72) Inventors: Sam Eric McMurry, Richardson, TX (US); Ajay Padmakar Deo, Carrollton, TX (US)

(73) Assignee: Oracle International Corporation, Redwood Shores, CA (US)

( * ) Notice: Subject to any disclaimer, the term of this patent is extended or adjusted under 35 U.S.C. 154(b) by 272 days.

(21) Appl. No.: 14/086,950

(22) Filed: Nov. 21, 2013

(65) Prior Publication Data

US 2015/0142940 A1 May 21, 2015

(51) Int. Cl.
*H04L 29/08* (2006.01)
*H04L 12/24* (2006.01)

(52) U.S. Cl.
CPC .......... *H04L 67/16* (2013.01); *H04L 41/0823* (2013.01); *H04L 41/0853* (2013.01); *H04L 41/14* (2013.01)

(58) Field of Classification Search
CPC . H04L 67/16; H04L 41/0853; H04L 41/0823; H04L 41/14
See application file for complete search history.

(56) References Cited

U.S. PATENT DOCUMENTS 6,505,244 B1 1/2003 Natarajan et al.
7,522,517 B1 4/2009 Johnson
(Continued)

FOREIGN PATENT DOCUMENTS

CN 101001401 A 7/2007
CN 101127609 2/2008
(Continued)

OTHER PUBLICATIONS

Notification of Transmittal of the International Search Report and the Written Opinion of the International Searching Authority, or the Declaration for International Application No. PCT/US2014/066240 (dated May 13, 2015).
(Continued)

*Primary Examiner* — Abdullahi E Salad
(74) *Attorney, Agent, or Firm* — Jenkins, Wilson, Taylor & Hunt, P.A.

(57) ABSTRACT

Methods, systems, and computer readable media for analyzing virtualization related information related to a telecommunications network for managing network virtualization are disclosed. In one embodiment, a system for analyzing virtualization related information related to a telecommunications network for managing network virtualization includes an information concentrator for analyzing virtualization related information related to a telecommunications network. The information concentrator may include a first interface for receiving the virtualization related information and an analysis engine for collecting and analyzing the received information, for determining a set of network virtualization related data based on the information, and for directing the network virtualization related data set to a node for making virtualization decisions.

20 Claims, 4 Drawing Sheets

(56) References Cited

U.S. PATENT DOCUMENTS

| | | | |
|---|---|---|---|
| 8,914,526 B1* | 12/2014 | Lindquist | H04L 29/06 709/229 |
| 9,298,515 B2 | 3/2016 | McMurry et al. | |
| 9,369,390 B2 | 6/2016 | Bantukul et al. | |
| 9,391,897 B2 | 7/2016 | Sparks et al. | |
| 9,398,492 B2 | 7/2016 | Deo | |
| 9,537,775 B2 | 1/2017 | McMurry et al. | |
| 2002/0004827 A1 | 1/2002 | Ciscon et al. | |
| 2002/0091810 A1 | 7/2002 | Hundscheidt et al. | |
| 2004/0199632 A1 | 10/2004 | Romero et al. | |
| 2008/0250156 A1 | 10/2008 | Agarwal et al. | |
| 2009/0232011 A1 | 9/2009 | Li et al. | |
| 2009/0327079 A1 | 12/2009 | Parker et al. | |
| 2010/0071035 A1* | 3/2010 | Budko | H04L 63/08 726/4 |
| 2010/0080172 A1 | 4/2010 | Jin et al. | |
| 2010/0125477 A1 | 5/2010 | Mousseau et al. | |
| 2010/0211956 A1 | 8/2010 | Gopisetty et al. | |
| 2010/0217850 A1* | 8/2010 | Ferris | H04L 63/20 709/223 |
| 2010/0220622 A1 | 9/2010 | Wei | |
| 2011/0016467 A1* | 1/2011 | Kane | G06F 9/45558 718/1 |
| 2011/0090900 A1 | 4/2011 | Jackson et al. | |
| 2011/0131332 A1 | 6/2011 | Bouazizi | |
| 2011/0200053 A1 | 8/2011 | Kanode et al. | |
| 2011/0202676 A1 | 8/2011 | Craig et al. | |
| 2012/0057602 A1 | 3/2012 | Tanimoto | |
| 2012/0158994 A1 | 6/2012 | McNamee et al. | |
| 2012/0239771 A1 | 9/2012 | Rasanen | |
| 2012/0281540 A1 | 11/2012 | Khan et al. | |
| 2012/0300615 A1 | 11/2012 | Kempf et al. | |
| 2012/0303835 A1 | 11/2012 | Kempf et al. | |
| 2013/0003745 A1 | 1/2013 | Nishimura | |
| 2013/0019277 A1* | 1/2013 | Chang | H04L 63/0218 726/1 |
| 2013/0064093 A1 | 3/2013 | Ridel et al. | |
| 2013/0124712 A1 | 5/2013 | Parker | |
| 2013/0173810 A1 | 7/2013 | Subramaniam | |
| 2013/0188489 A1 | 7/2013 | Sato | |
| 2013/0223219 A1 | 8/2013 | Mir et al. | |
| 2013/0250770 A1 | 9/2013 | Zou et al. | |
| 2013/0263208 A1* | 10/2013 | Challa | G06F 21/44 726/1 |
| 2013/0266007 A1 | 10/2013 | Kumbhare et al. | |
| 2013/0343295 A1 | 12/2013 | Deo | |
| 2014/0026231 A1* | 1/2014 | Barak | G06F 9/45558 726/29 |
| 2014/0032651 A1 | 1/2014 | Singh et al. | |
| 2014/0089495 A1 | 3/2014 | Akolkar et al. | |
| 2014/0105140 A1 | 4/2014 | Guo | |
| 2014/0172739 A1 | 6/2014 | Anderson et al. | |
| 2014/0192646 A1 | 7/2014 | Mir et al. | |
| 2014/0193154 A1 | 7/2014 | Graham et al. | |
| 2014/0215076 A1 | 7/2014 | Grothues | |
| 2014/0215077 A1 | 7/2014 | Soudan et al. | |
| 2014/0233389 A1 | 8/2014 | Bantukul et al. | |
| 2014/0237111 A1 | 8/2014 | McMurry et al. | |
| 2014/0304416 A1 | 10/2014 | Khasnabish | |
| 2014/0310388 A1 | 10/2014 | Djukic et al. | |
| 2014/0348068 A1 | 11/2014 | Morper et al. | |
| 2015/0036505 A1 | 2/2015 | Sparks et al. | |
| 2015/0046591 A1 | 2/2015 | Zhu et al. | |
| 2015/0085663 A1* | 3/2015 | McMurry | H04L 47/127 370/236 |
| 2015/0149656 A1 | 5/2015 | McMurry et al. | |
| 2015/0172115 A1 | 6/2015 | Nguyen et al. | |
| 2015/0215228 A1 | 7/2015 | McMurry | |
| 2016/0315809 A1 | 10/2016 | McMurry et al. | |

FOREIGN PATENT DOCUMENTS

| | | |
|---|---|---|
| JP | 2013-098597 A | 5/2013 |
| JP | 6096325 B2 | 3/2017 |
| KR | 10-2009-0033968 | 4/2009 |
| KR | 10-2012-0055955 | 6/2012 |
| KR | 10-2012-0059542 | 6/2012 |
| WO | WO 2009/070179 A1 | 6/2009 |
| WO | WO 2011/013805 A1 | 2/2011 |
| WO | WO 2011/101745 A2 | 8/2011 |
| WO | WO 2011/161575 A1 | 12/2011 |
| WO | WO 2012/003764 A1 | 1/2012 |
| WO | WO 2012/055446 A1 | 5/2012 |
| WO | WO 2012/056816 A1 | 5/2012 |
| WO | WO 2012/100092 A2 | 7/2012 |
| WO | WO 2012/129167 A1 | 9/2012 |
| WO | WO 2012/130264 A1 | 10/2012 |
| WO | WO 2012/160465 A1 | 11/2012 |
| WO | WO 2013/188665 A1 | 12/2013 |
| WO | WO 2014/127346 A1 | 8/2014 |
| WO | WO 2014/127347 A1 | 8/2014 |
| WO | WO 2015/017422 A1 | 2/2015 |
| WO | WO 2015/041750 A1 | 3/2015 |
| WO | WO 2015/080906 A1 | 6/2015 |
| WO | WO 2015/116449 A1 | 8/2015 |

OTHER PUBLICATIONS

Non-Final Office Action for U.S. Appl. No. 13/956,304 (dated May 4, 2015).

Commonly-assigned, co-pending U.S. Appl. No. 14/692,710 for "Methods, Systems, and Computer Readable Media for Multi-Layer Orchestration in Software Defined Networks (SDNs)," (Unpublished, filed Apr. 21, 2015).

Notification of Transmittal of the International Search Report and the Written Opinion of the International Searching Authority, or the Declaration for PCT International Application No. PCT/US2015/012250 (dated Mar. 31, 2015).

Communication of European Publication Number and Information on the Application of Article 67(3) EPC for European Application No. 13804779.0 (dated Mar. 25, 2015).

Non-Final Office Action for U.S. Appl. No. 14/034,478 (dated Mar. 23, 2015).

Non-Final Office Action for U.S. Appl. No. 13/917,200 (dated Mar. 16, 2015).

Notification of Transmittal of the International Search Report and the Written Opinion of the International Searching Authority, or the Declaration for International Application No. PCT/US2014/066469 (dated Feb. 20, 2015).

"Network Function Virtualization (NFV) Management and Orchestration," ETSI, Group Specification, GS NFV-MAN 001 V0.0.11, pp. 1-74 (Oct. 18, 2013).

"Split Architecture for Large Scale Wide Area Networks," SPARC ICT-258457 Deliverable D3.3, pp. 1-129 (Dec. 1, 2011).

Commonly-assigned, co-pending International Application No. PCT/US15/12250 for "Methods, Systems, and Computer Readable Media for a Cloud-Based Virtualization Orchestrator," (Unpublished, filed Jan. 21, 2015).

Commonly-assigned, co-pending International Application No. PCT/US14/66469 for "Methods, Systems, and Computer Readable Media for a Network Function Virtualization Information Concentrator," (Unpublished, filed Nov. 19, 2014).

Commonly-assigned, co-pending International Application No. PCT/US14/66240 for "Methods, Systems, and Computer Readable Media for Diameter Routing Using Software Defined Network (SDN) Functionality," (Unpublished, filed Nov. 18, 2014).

Notification of Transmittal of the International Search Report and the Written Opinion for of the International Searching Authority, or the Declaration for International Application No. PCT/US2014/048651 (dated Nov. 17, 2014).

Notification of Transmittal of the International Search Report and the Written Opinion of the International Searching Authority, or the Declaration for International Application No. PCT/US2014/048644 (dated Oct. 17, 2014).

Commonly-assigned, co-pending International Application No. PCT/US14/48651 for "Methods, Systems, and Computer Readable Media for Diameter Load and Overload Information and Virtualization," (Unpublished, filed Jul. 29, 2014).

(56) References Cited

OTHER PUBLICATIONS

Commonly-assigned, co-pending International Application No. PCT/US14/48644 for "Methods, Systems, and Computer Readable Media for Mitigating Traffic Storms," (Unpublished, filed Jul. 29, 2014).
Notification of Transmittal of the International Search Report and the Written Opinion of the International Searching Authority, or the Declaration for International Application No. PCT/US2014/016853 (dated Jun. 6, 2014).
Notification of Transmittal of the International Search Report and the Written Opinion of the International Searching Authority, or the Declaration for International Application No. PCT/US2014/016860 (dated Jun. 4, 2014).
Commonly-assigned, co-pending U.S. Appl. No. 14/166,790 for "Methods, Systems, and Computer Readable Media for a Cloud-Based Virtualization Orchestrator," (Unpublished, filed Jan. 28, 2014).
Commonly-assigned, co-pending U.S. Appl. No. 14/034,478 for "Methods, Systems, and Computer Readable Media for Diameter Load and Overload Information and Virtualization," (Unpublished, filed Sep. 23, 2013).
Notification of Transmittal of the International Search Report and the Written Opinion of the International Searching Authority, or the Declaration for International Application No. PCT/US2013/045652 (dated Sep. 17, 2013).
Tschofenig, "Diameter Overload Architecture and Information Model," draft-tschofenig-dime-overload-arch-00.txt, DIME, pp. 1-9 (Jul. 16, 2013).
"3rd Generation Partnership Project; Technical Specification Group Core Network and Terminals; Study on Diameter overload control mechanisms (Release 12)," 3GPP TR 29.809 V0.3.0, pp. 1-51 (Jun. 2013).
Wendong et al., "Autonomicity Design in OpenFlow Based Software Defined Networking," GC'12 Workshop: The 4th IEEE International Workshop on Management of Emerging Networks and Services, pp. 818-823 (Dec. 3, 2012).
"3rd Generation Partnership Project; Technical Specification Group Services and System Aspects; Policy and charging control architecture (Release 11)," 3GPP TS 23.203, V11.8.0 pp. 1-179 (Dec. 2012).
Fajardo et al., "Diameter Base Protocol," RFC 6733, pp. 1-152 (Oct. 2012).
"Software-Defined Networking: The New Norm for Networks," ONF White Paper, Open Networking Foundation, pp. 1-12 (Apr. 13, 2012).
"OpenFlow Switch Specification," https://www.opennetworking.org/images/stories/downloads/sdn-resources/onf-specifications/openflow/openflow-spec-v1.2.pdf, Version 1.2 (Wire Protocol 0x03), Open Networking Foundation, pp. 1-85 (Dec. 5, 2011).
Chapman et al., "Software architecture definition for on-demand cloud provisioning," Cluster Computing, vol. 15, No. 2, pp. 79-100 Feb. 27, 2011).
3rd Generation Partnership Project, "Technical Specification Group Services and System Aspects; Policy and charging control architecture (Release 9)," 3GPP TS 23.203 V9.3.0 (Dec. 2009).
Dörnemann et al., "On-Demand Resource Provisioning for BPEL Workflows Using Amazon's Elastic Compute Cloud," 9th IEEE/ACM International Symposium on Cluster Computing and the Grid, pp. 140-147 (May 18, 2009).
Notice of Allowance and Fee(s) Due for U.S. Appl. No. 14/182,864 (dated Feb. 17, 2016).
Non-Final Office Action for U.S. Appl. No. 14/166,790 (dated Feb. 2, 2016).
Applicant-Initiated Interview Summary for U.S. Appl. No. 13/956,304 (dated Feb. 1, 2016).
Extended European Search Report for European Application No. 13804779.0 (dated Jan. 19, 2016).
Advisory Action Before the Filing of an Appeal Brief and AFCP 2.0 Decision for U.S. Appl. No. 13/917,200 (dated Jan. 14, 2016).
Applicant-Initiated Interview Summary for U.S. Appl. No. 14/092,898 (dated Jan. 14, 2016).
Applicant-Initiated Interview Summary for U.S. Appl. No. 14/182,864 (dated Dec. 16, 2015).
Supplemental Notice of Allowability for U.S. Appl. No. 14/182,800 (dated Dec. 1, 2015).
Communication of European Publication Number and Information on the Application of Article 67(3) EPC for European Patent Application No. 14710682.7 (dated Nov. 25, 2015).
Advisory Action for U.S. Appl. No. 14/034,478 (dated Nov. 17, 2015).
Notice of Allowance and Fee(s) Due for U.S. Appl. No. 14/182,800 (dated Nov. 10, 2015).
Final Office Action for U.S. Appl. No. 13/956,304 (dated Nov. 3, 2015).
Final Office Action for U.S. Appl. No. 13/917,200 (dated Oct. 22, 2015).
Non-Final Office Action for U.S. Appl. No. 14/092,898 (dated Oct. 8, 2015).
Non-Final Office Action for U.S. Appl. No. 14/182,864 (dated Sep. 23, 2015).
Final Office Action for U.S. Appl. No. 14/034,478 (dated Sep. 8, 2015).
Applicant-Initiated Interview Summary for U.S. Appl. No. 13/956,304 (dated Aug. 5, 2015).
Applicant-Initiated Interview Summary for U.S. Appl. No. 13/917,200 (dated Jul. 27, 2015).
Amendment for U.S. Appl. No. 13/749,655 (dated Jul. 6, 2015).
Kempf et al., "Moving the Mobile Evolved Packet Core to the Cloud," 2012 Fifth International Workshop on Selected Topics in Mobile and Wireless Computing, pp. 1-8 (Oct. 8, 2012).
Li Erran et al., "CellSDN: Software-Defined Cellular Networks," ftp://ftp.cs.princeton.edu/techeports/2012/922.pdf, pp. 1-6 (Apr. 20, 2012).
Communication of European publication number and information on the application of Article 67(3) EPC for European Application No. 14812840.8 (dated Aug. 31, 2016).
Final Office Action for U.S. Appl. No. 14/092,898 (dated Sep. 8, 2016).
Communication of European publication number and information on the application of Article 67(3) EPC for European Application No. 14812837.4 (dated Sep. 7, 2016).
Letter Regarding Office Action for Japanese Patent Application No. 2015-558193 (dated Aug. 30, 2016).
Letter Regarding Office Action for Japanese Patent Application No. 2015-558191 (dated Aug. 30, 2016).
Notice of Allowance and Fee(s) Due and Examiner-Initiated Interview Summary for U.S. Appl. No. 14/034,478 (dated Aug. 25, 2016).
Final Office Action for U.S. Appl. No. 14/166,790 (dated Aug. 11, 2016).
Communication of European publication number and information on the application of Article 67(3) EPC for European Patent Application No. 14755210.3 (dated Jul. 6, 2016).
Communication of European Publication Number and Information on the Application of Article 67(3) EPC for European Patent Application No. 14755208.7 (dated May 11, 2016).
Applicant-Initiated Interview Summary for U.S. Appl. No. 14/166,790 (dated Apr. 14, 2016).
Non-Final Office Action for U.S. Appl. No. 14/034,478 (dated Apr. 5, 2016).
Notice of Allowance and Fee(s) Due for U.S. Appl. No. 13/917,200 (dated Mar. 28, 2016).
Notice of Allowance and Fee(s) Due for U.S. Appl. No. 13/956,304 (dated Mar. 16, 2016).
Business Communication, Kabushikikaisha Business-Communication-sha (Japan), vol. 49, No. 11, pp. 60-61 (Nov. 1, 2012).
Letter regarding Official Notice of Grant for Japanese Patent Application No. 2015-558193 (dated Feb. 28, 2017).
Non-Final Office Action for U.S. Appl. No. 14/166,790 (dated Feb. 28, 2017).
Letter regarding Official Notice of Grant for Japanese Patent Application No. 2015-558191 (dated Jan. 31, 2017).

(56) References Cited

OTHER PUBLICATIONS

Examiner Initiated Interview Summary and Notice of Decision from Post-Prosecution Pilot Program (P3) Conference for U.S. Appl. No. 14/092,898 (dated Jan. 30, 2017).
Communication under Rule 71(3) EPC of Intention to Grant for European Application No. 14 710 682.7 (dated Jun. 21, 2017).
Applicant-Initiated Interview Summary for U.S. Appl. No. 14/166,790 (dated Jun. 12, 2017).
Letter Regarding Japanese Office Action for Japanese Patent Application No. 2016-531821 (dated Jun. 6, 2017).
Letter Regarding Notice of Grant for Japanese Patent Application No. 2015-517426 (dated May 30, 2017).
Notification of the First Office Action for Chinese Patent Application No. 201380031363.5 (dated May 3, 2017).
Notice of Allowance and Fee(s) Due for U.S. Appl. No. 13/863,351 (dated Apr. 20, 2017).
Letter regaridng Final Decision for Rejection for Japanese Patent Application No. 2015/555185 (dated Feb. 14, 2017).
Nakahira, "Applications for Software Defined Network Technologies on Edge Networks in the Future Network," IEICE Technical Report, vol. 112, No. 230, pp. 109-114 (Oct. 3, 2012).
Letter regarding Japanese Office Action for Japanese Patent Application No. 2015-517426 (dated Dec. 6, 2016).
Advisory Action, Applicant-Initiated Interview Summary, and AFCP 2.0 Decision for U.S. Appl. No. 14/166,790 (dated Nov. 30, 2016).
Communication of European publication number and information on the application of Article 67(3) EPC for European Application No. 15703372.1 (dated Nov. 9, 2016).
Applicant-Initiated Interview Summary for U.S. Appl. No. 14/166,790 (dated Oct. 28, 2016).

\* cited by examiner

METHODS, SYSTEMS, AND COMPUTER READABLE MEDIA FOR A NETWORK FUNCTION VIRTUALIZATION INFORMATION CONCENTRATOR

TECHNICAL FIELD

The subject matter described herein relates to methods and systems for analyzing virtualization related information related to a telecommunications network. More particularly, the subject matter described herein relates to methods, systems, and computer readable media for a network function virtualization information concentrator of a telecommunications network.

BACKGROUND

A cloud network can include a large number of computers connected through a communication link, such as the Internet. The ability to run a program on many connected computers within the cloud network can be generally referred to as cloud computing. Cloud computing can cut costs and help users to focus on their core businesses by offering converged infrastructures and shared services. The main enabling technology for cloud computing is virtualization. Virtualization abstracts physical infrastructures and makes them available as software components. By doing that, virtualization not only speeds up network operations and increases infrastructure utilization, but it also improves scalability. Each virtual server can start out by having just enough computing power and storage capacity that the client needs, but when the needs grow, more power and capacity can be allocated to that server, or lowered if needed. virtualization related information such as network traffic data and/or CPU usages can indicate a demand for redistribution of network resources. The redistribution of network resources can be performed in a semi-dynamic fashion, where operators can interact with the cloud network via Graphic User Interfaces to manually move network components around. However, such set up is inefficient for a telecommunications network, and inadequately prepared for sudden changes in network usages.

Accordingly, there exists a need for methods, systems, and computer readable media for analyzing virtualization related information related to a telecommunications network for more efficient and responsive management of network virtualization.

SUMMARY

According to one aspect, the subject matter described herein may include a method for analyzing virtualization related information related to a telecommunications network for managing network virtualization. The method may include, at an information concentrator including a hardware processor and for collecting and analyzing virtualization related information, receiving virtualization related information, determining a set of network virtualization related data based on the received information, and directing the set of network virtualization related data to a node for making virtualization decisions.

According to another aspect, the subject matter described herein comprises a system for analyzing virtualization related information related to a telecommunications network for managing network virtualization. The system may include an information concentrator for analyzing virtualization related information related to a telecommunications network, the information concentrator including a first interface for receiving the virtualization related information and an analysis engine for collecting and analyzing the received information, for determining a set of network virtualization related data based on the information, and for directing the network virtualization related data set to a node for making virtualization decisions.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

In context of telecommunications networks, the terms "load" and "overload" have somewhat overlapping meanings: for example, a node may be said to be "loaded" when its utilization is greater than 0% and less than an engineered capacity and "overloaded" when its utilization is greater than the engineered loading capacity. For example, a node that is part of a matched pair of nodes that provide the same function in a distributed manner may be considered "overloaded" if its capacity is greater than 50%, since the other 50% must be reserved for use in case the other node in the pair fails and causes the failing node's traffic to be handled by the remaining node. Similarly, if a node reports its utilization as being less than some overload threshold, such as message may be considered a "load indication", but if the node reports its utilization as being greater than the threshold, such as message may be considered an "overload indication". In other words, the difference between a "load message" and an "overload message" may be a matter of degree. For simplicity, the terms "load" and "overload" will be used synonymously herein unless explicitly stated otherwise. Thus, as used herein, the terms "load information" and "overload information" are synonymous and refer to information that indicates the load level, rate, throughput, or capacity at which a Diameter node or group of nodes are currently operating under.

As used herein, the term "state information" refers to information pertaining to state of network traffic related to a telecommunications network, state of network topology, state of network virtualization rules, and/or state of applications and products related to the telecommunications network, which can include but not limited to, what the network and related applications are doing and how busy they are.

As used herein, the term "network virtualization operation" refers to operational commands and/or information related to network resource virtualization, and includes virtualization related information such as network performance indicators, cloud network management information, and/or external cloud network resource information.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for analyzing virtualization related information related to a telecommunications network for managing network virtualization.

In some embodiments, virtualization related information such as network traffic queues and/or server CPU usages may be collected at an information concentrator. The information concentrator may include several plugin modules such as a Policy and Charging Rules Function (PCRF) plugin and a Tekelec vCloud plugin for collecting virtualization related information from within and external to the telecommunications network. The information concentrator may also maintain several databases for storing virtualization rules and network state information for network virtualization purposes. In some embodiments, the information concentrator may analyze the received virtualization related information by applying analytical algorithms to the data and look for characteristic patterns. A set of network virtualization related data may be determined based on the analyzed virtualization related information, and such operations may be forwarded to a virtualization orchestrator.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
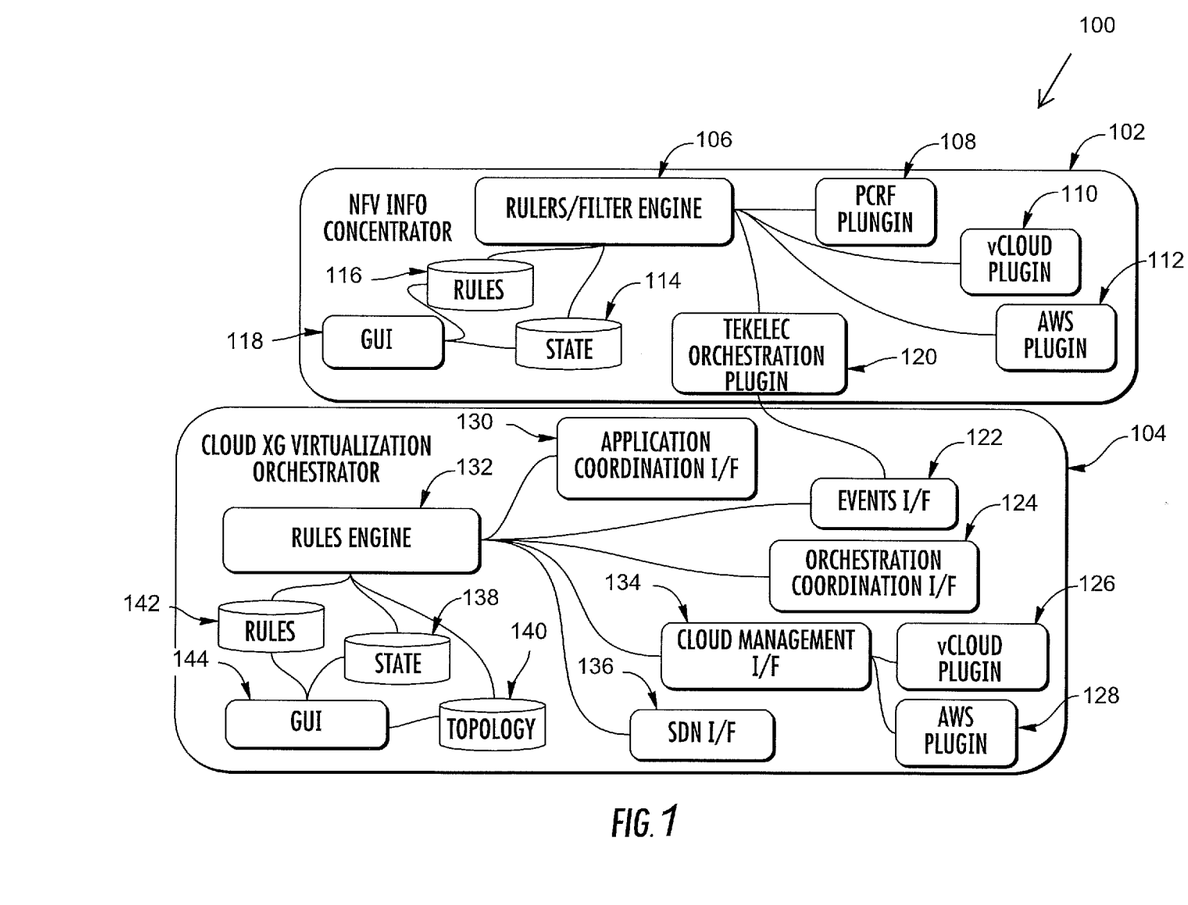
FIG. 1 is a diagram illustrating an exemplary embodiment of a system for analyzing virtualization related information related to a telecommunications network for managing network virtualization according to an embodiment of the subject matter described herein.

FIG. 1 is a diagram illustrating an exemplary embodiment of a system, generally designated 100, for analyzing virtualization related information related to a telecommunications network for managing network virtualization according to an embodiment of the subject matter described herein. As depicted in FIG. 1, system 100 may include an information concentrator 102 in communication with a virtualization orchestrator 104. For example, the information concentrator may be a Tekelec network function virtualization (NFV) information concentrator 102 configured to receive and analyze virtualization related information both from within and external to the telecommunications network. The NFV information concentrator 102 may be capable of determining a set of network virtualization related data based on the received information. The network virtualization related data can include information related to assigning or removing at least one additional network resource to a network component, information about identifying a trend in network resource usage or requirement, information about predicting future network resource usage or requirements, and information about providing notification of an emergency condition. The virtualization orchestrator may be a Tekelec Cloud XG virtualization orchestrator 104 configured to receive system inputs from various applications and products related to the telecommunications network, and may determine network virtualization operations based on the received inputs. The NFV information concentrator 102 may communicate with the Cloud XG virtualization orchestrator via an orchestration plugin module such as a Tekelec orchestration plugin 120.

In some embodiments, the NFV information concentrator 102 may receive virtualization related information related to the telecommunications network via a plugin module. Examples of virtualization related information include, but are not limited to, system performance indicators, cloud management information, information related to external networks, and information that is not related to telecommunications networks at all or only peripherally related to telecommunications networks. For example, information concentrator 102 may include a plugin for receiving information from another node in the telecommunication network. In the embodiment illustrated in FIG. 1, for example, information concentrator 102 includes a Policy and Charging Rules Function (PCRF) plugin 108, may be configured to supply network performance indicators to the information concentrator 102. Network performance indicators may include information such as network load, network traffic queue depth, and/or latency characteristics on various network elements. Information concentrator 102 may include the same or other plugins for receiving various types of information from various types of nodes in the telecommunications network. Similarly, a cloud management plugin such as a Tekelec vCloud plugin 110 may be configured to direct cloud management information to the information concentrator 102. Cloud management information may include information such as processor load on virtual machines, and/or network load and overload information. Furthermore, an information collection module may be configured to direct network information from an external cloud network to the information concentrator 102. For example, information from Amazon's cloud network may be collected and directed to the information concentrator 102 via an Amazon Web Service (AWS) plugin module 112. Likewise, other information collection modules may be utilized by the information concentrator 102 to receive information from analytical applications, products external to the telecommunications network. Mobile social depositories, and/or data networks associated with entities such as a power company can all direct virtualization related information to the information concentrator 102. For example, local, state or national news or other public events such as natural disasters or terrorist activities can be collected and used by a telecommunications network for network virtualization purposes. In other examples, the information concentrator 102 can use relevant information collected by government agencies such as emergency/disaster services to manage network resources accordingly. In addition, special occasions such as holidays, or particular times during a day can be utilized by the information concentrator 102 to predict or detect characteristic patterns within the collected virtualization related information. In some embodiments, virtualization related information may be directed to the information concentrator 102 via any type of information collection module. It should be noted that the diagram as shown in FIG. 1 is provided to explain the subject matter and not as a limitation.

In some embodiments, the received virtualization related information may be analyzed by a rules/filter engine 106 of the information concentrator 102. For example, the rules/filter engine 106 may be implemented with multiple sets of provision rules, data filters, and/or algorithms for processing received virtualization related information. Furthermore, the rules/filter engine 106 may be in communication with a rules database 116 configured for storing network virtualization operation rules, and/or a state database 114 configured for maintaining network state information. The rules/filter engine 106 may perform data filtering to the received information in conjunction with the rules and state information supplied by the rules 116 and state 114 databases. In other embodiments, the rules engine 106 may apply specific algorithms to the received virtualization related information. For example, signal processing and/or machine learning algorithms may be applied by the rules/filter engine 106 to analyze the received information, and characteristic patterns of the received information may be detected and utilized for determining a set of network virtualization related data. It should be noted that those having skill in the art would recognize that different types of algorithms can be conveniently combined in any of a variety of ways to further process and/or filter the received virtualization information. In addition, the NFV virtualization orchestrator 102 may include a Graphical User Interface (GUI) module 118 configured for interaction with an ender user. For example, the ender user may receive system status information from the GUI module 118, which may include current network topology and/or load and overload information as well as entering network virtualization related data into the rules/filter engine 106.

In some embodiments, the information concentrator 102 may be configured to generate virtualization related information designed to maintain the states of the telecommunications network. In some embodiments, a network state can include any entity or configuration that a telecommunications network may use to properly function. Maintaining a network state can include maintaining the network's current and/or maximum load, maintaining the network's topology, and/or maintaining the network's configuration or provision statuses. For example, after processing the received virtualization related information, the information concentrator 102 may generate a new set of virtualization related information signaling network nodes and/or applications to maintain its current state.

In some embodiments, the set of network virtualization related data generated by the information concentrator's 102 rules/filter engine 106 may include network virtualization operations, network event information, and/or network trend information. For example, the rules/filter engine 106 may apply a signal processing algorithm to the received virtualization related information, and detects or catches a characteristic pattern which can indicate an upcoming network overload. The rules/filter engine 106 may determine or generate a network virtualization operation based on the detected pattern, and advises a virtualization orchestrator to take actions to compensate for the upcoming network overload. In another example, the rules/filter engine 106 may process the received virtualization related information and extract characteristic patterns related to special events or occasions or conditions. For example, during Thanksgiving time a telecommunications network may experience larger than usual amount of text messaging traffic. Such pattern in the network traffic can be forwarded to a virtualization orchestrator by the information concentrator 102 for further processing. In yet another example, the information concentrator 102 can detect trends in network operational conditions and direct this information to a virtualization orchestrator. For example, a telecommunications network may have experienced ten percent increases in text messaging traffic each year for the past three years. The information concentrator 102 can extract such trend from the received virtualization related information and direct it to a virtualization orchestrator.

In some embodiments, the generated network virtualization related data including network virtualization operations, network event information, and/or network trend information may be directed to a virtualization orchestrator via an interface plugin module. For example, upon learning that a network overload may be imminent, the NFV information concentrator 102 may direct the network virtualization operation to the Cloud XG virtualization orchestrator 104 via a Tekelec orchestration plugin module 120 configured for bi-directional communication between the information concentrator 102 and the virtualization orchestrator 104. The Tekelec orchestration plugin module 120 may transmit virtualization operation commands to the virtualization orchestrator 104 as well as feeding topology information back to the information concentrator 102.

In some embodiments, the Cloud XG virtualization orchestrator 104 may receive, for example, a network virtualization operation via an interface module of its own. As shown in FIG. 1, the Tekelec orchestration plugin 120 may be connected to an events I/F module 122 of the Cloud XG virtualization orchestrator 104. The events I/F 122 may be configured as a bi-directional interface module supplying analytic data and network virtualization operations to the Cloud XG virtualization orchestrator 104, and direct messages such as network coordination commands back to the NFV information concentrator 102. A network virtualization operation may be received by the events I/F module 122 and then forwarded to a rules engine 132 of the Cloud XG virtualization orchestrator 104.

In some embodiments, the rules engine 132 may be connected to a rules database 142 which may be configured to store network virtualization rules, a state database 138 configured for maintaining network state information, and/or a topology database 140 configured for maintaining network topology information. Furthermore, the rules engine 132 may be connected to a Graphical User Interface (GUI) 144 configured to provide network status information to an end user.

In some embodiments, a set of network virtualization related data generated by the NFV information concentrator 102 may be further processed by the Cloud XG virtualization orchestrator 104 to determine a new network virtualization operation. The rules engine 132 within the Cloud XG virtualization orchestrator 104 may generate a new network virtualization operation based on the received virtualization operation, by applying its own algorithms in conjunction with network virtualization rules supplied by the rules database 142, network state information from the state database 138, and/or network topology information from the topology database 140. For example, the NFV information concentrator 102 may transmit a set of network virtualization related data to the Cloud XG virtualization orchestrator indicating an upcoming 30% overload on one of the network component, and calls for allocating additional switches and storage resources to compensate the overload condition. Upon reviewing the current state and topology of the network, the rules engine 132 may determine a new network virtualization operation which directs the network not to allocating any resources for that overload condition, because there are other more urgent needs within the network demanding the same resources.

In some embodiments, the new network virtualization operation generated by the rules engine 132 may be directed to various applications and products within the telecommunications network, via an application coordination I/F module 130. For example, the application coordination I/F module 130 may be a PCRF plugin module configured to interact with applications and products within the telecommunications network. The PCRF plugin may be used to control topology and provisioning configurations to the various network resources within the telecommunications network. In addition, the PCRF plugin may be configured to be a bi-directional interface module and supply network performance indicators such as processor and disk usage or network traffics back to the rules engine 132.

In some embodiments, the rules engine 132 may direct the network virtualization operation to an orchestration coordination I/F module 124 configured for bi-directional communication with a second virtualization orchestrator managing a different telecommunications network. For example, the rules engine 132 may direct network orchestration operations and service requests to the second virtualization orchestrator, who is managing a different and larger cloud network, via the orchestration coordination I/F module 124, and receive back status information on the larger cloud network. Similarly, the Cloud XG virtualization orchestrator 104 may be implemented as a main virtualization orchestrator managing an entire telecommunications network, and the orchestration coordination I/F module 124 may be configured to interface with lesser virtualization orchestrators who are managing parts of the network.

In some embodiments, network virtualization operations may be directed to other telecommunications networks via a cloud management I/F module 134. Sometimes the Cloud XG virtualization orchestrator 104 may wish to establish communication with a cloud network that does not utilize an orchestrator. The cloud management I/F module 134, coupled with a cloud management plugin module, may provide the means for network communication and virtualization operations between cloud networks. For example, the cloud management I/F module 134 may be coupled with a vCloud plugin module 126, and the vCloud plugin module 126 may be configured to collect cloud management related information such as processor load on virtue machines and/or network traffic information from another cloud network. Similarly, an Amazon Web Service (AWS) plugin module 128 may be coupled with the cloud management I/F module 134 and configured to collect information from Amazon cloud networks. It will be appreciated that cloud management I/F 134 may be coupled with plugin modules not depicted via additional and/or different interface modules.

In some embodiments, network virtualization operations may be directed to a Software Defined Networking (SDN) I/F module 136 configured for control network traffics. Through the SDN I/F module 136 the rules engine 132 may transmit network virtualization operations directly to network hardware resources without having to physically access them. It should be noted that the example presented here is to illustrate an exemplary embodiment of communication between the information concentrator 102 and the virtualization orchestrator, and those having skill in the art would recognize that other types of network virtualization such as network trends and events information can be transmitted just as easily via similar data paths.

Figure 2:
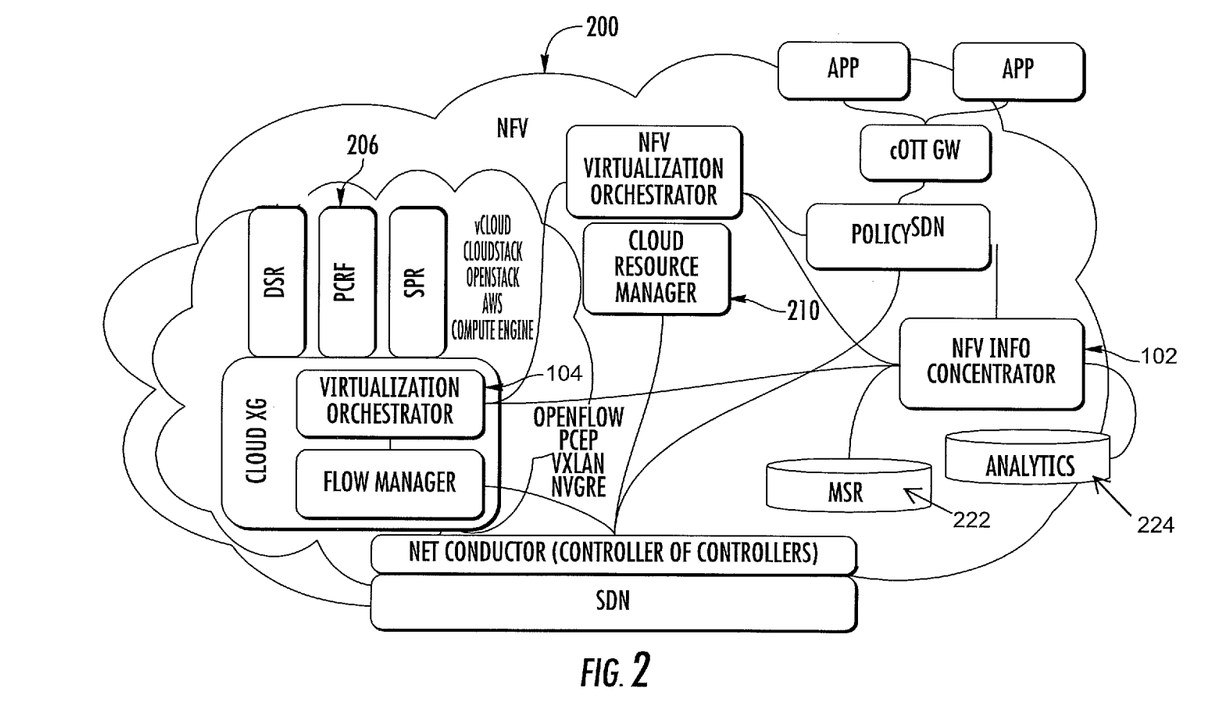
FIG. 2 is a diagram illustrating an exemplary embodiment of an information concentrator directing network virtualization related data to a virtualization orchestrator within a telecommunications network according to an embodiment of the subject matter described herein.

FIG. 2 is a diagram illustrating an exemplary embodiment, generally designated 200, of an information concentrator directing network virtualization related data sets to a virtualization orchestrator within a telecommunications network according to an embodiment of the subject matter described herein. A set of network virtualization related data can include information related to assigning or removing at least one additional network resource to a network component, information about identifying a trend in network resource usage or requirement, information about predicting future network resource usage or requirements, and information about providing notification of an emergency condition. As illustrated in FIG. 2, exemplary embodiment 200 may be a network function virtualization (NFV) cloud network operating one or more virtualization orchestrators for managing network resources. For example, a NFV virtualization orchestrator 202 may be configured to manage the entire cloud network. In addition, a product or application specific virtualization orchestrator such as a Tekelec Cloud XG virtualization orchestrator 104 may be configured to manage Tekelec specific products. The Cloud XG virtualization orchestrator 104 may manage Tekelec products more efficiently because it has architectural and business rules implemented specifically for Tekelec products. For example, a Policy and Charging Rules Function (PCRF) 206 may have three functions within itself which need to be connected in certain ways and certain ratios, and the Cloud XG virtualization orchestrator 104 is configured to specifically accommodate that type of system requirement.

In some embodiments, the NFV information concentrator 102 may be in direct communication with both the NFV virtualization orchestrator 202 and the Cloud XG virtualization orchestrator 104, thus directing virtualization related data and network virtualization operations to both orchestrators. The NFV information concentrator 102 may receive information from a MobileSocial™ repository (MSR) 222 and/or an analytics module 224. The MSR 222 may include a high-throughput database which enables operators to collect large volumes of subscriber and relevant network data based on the latest advances in big data technology. MSR 222 may also accept real-time feeds from multiple network sources without any service impacts to determine subscriber behavior, norms, preferences and social connections. Furthermore, the MSR 222 may get information from any source, including other nodes and nodes that use other protocols. For example, switches, gateways, routers, and signaling transfer points may provide MSR 222 with information about the network and its performance, including indicators of failure and congestion, identification of traffic patterns etc. The analytics module 224 may supply virtualization related information related to subscriber behaviors, norms, preferences, and/or connections to the NFV information concentrator 102. For example, the analytics module 224 may draw inferences between subscriber individual behaviors, subscriber group behaviors, and/or network status. Analytical data such as a particular subscriber demographic is responsible for a large percentage of traffic during peak congestion times may be transmitted to the NFV information concentrator 102. The NFV information concentrator 102 may then determine a network virtualization operation which directs the telecommunications network to offer subscribers in that demographic discounted data rates during off-peak houses, in order to ease congestion.

In some embodiments, as shown in FIG. 2, the Cloud XG virtualization orchestrator 104 may communicate directly with the NFV virtualization orchestrator 202. For example, network virtualization operations generated by the Cloud XG virtualization orchestrator 104 may be directly received and performed by the NFV virtualization orchestrator. In other embodiments, the Cloud XG virtualization orchestrator 104 may be in communication with a cloud resource manager 210. The cloud resource manager 210 may be configured to directly manage the network resources. It knows the capabilities of the hardware, knows what virtual machines can run on it, and may manage the network components mechanically.

Figure 3:
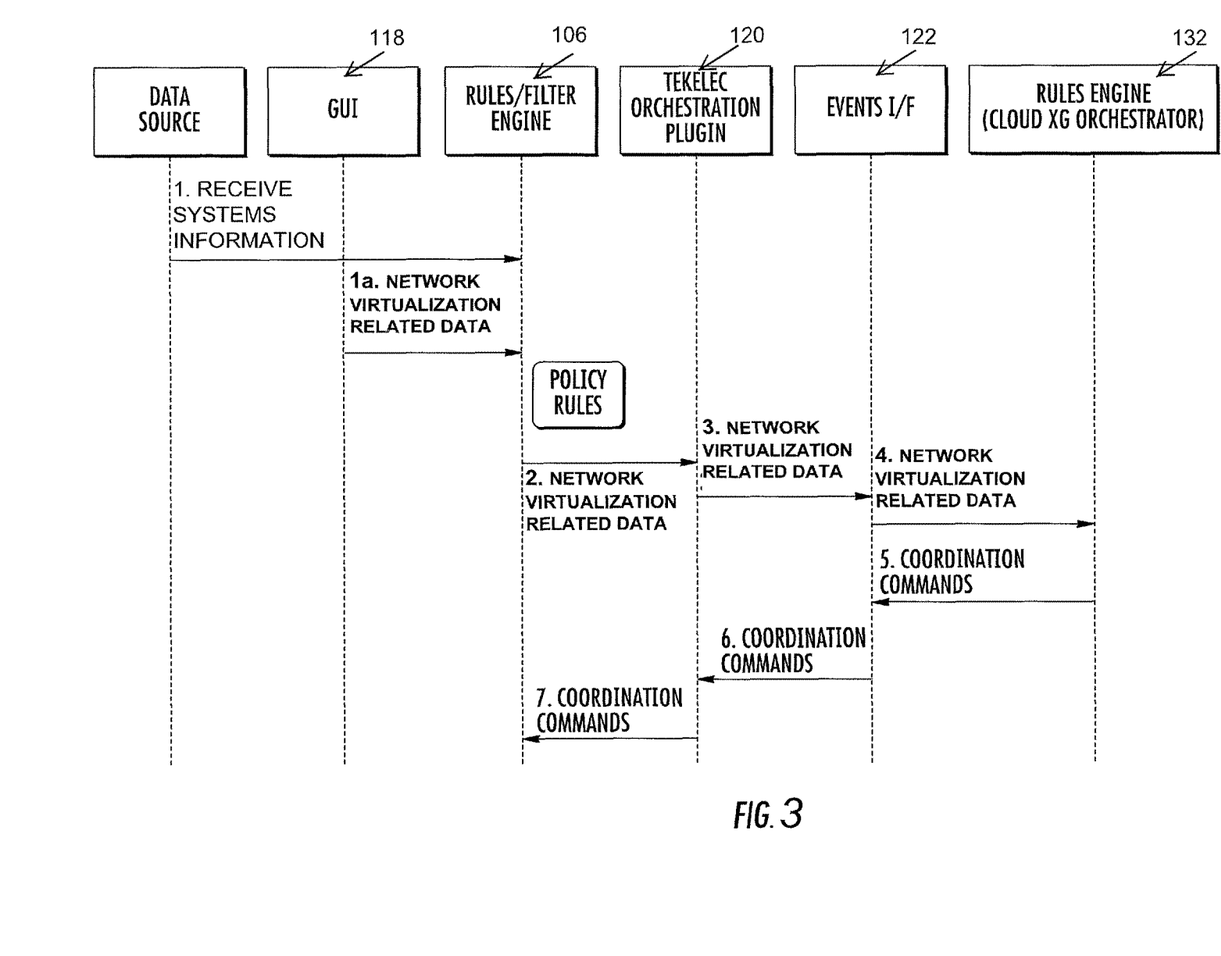
FIG. 3 is a message flow diagram illustrating exemplary messaging for receiving and analyzing virtualization related information in a telecommunications network according to an embodiment of the subject matter described herein.

FIG. 3 is a message flow diagram illustrating exemplary messaging for receiving and analyzing virtualization related information in a telecommunications network according to an embodiment of the subject matter described herein. At step 1, the rules/filter engine 106 of the NFV information concentrator 102 may receive virtualization related information related to a telecommunications network via data sources such as plugin modules. For example, the rules/filter engine 106 may receive from a PCRF plugin 108 network performance indicators such as network load and network traffic queue depth; and/or from a Tekelec vCloud plugin 110 network management information such as process load on virtual machines and network load and overload information.

At step 1a, an end user may enter network virtualization related commands and/or data directly to the rules/filter engine 106 via a GUI module 118. At step 2, the rules/filter engine 106 may apply data analyzing algorithms to the received virtualization related information and determine a set of network virtualization related data based on the received information. For example, the rules/filter engine 106 may be implemented with algorithms for processing received virtualization related information. Furthermore, the rules/filter engine 106 may be in communication with a rules database 116 configured for storing network virtualization operation rules, and/or a state database 114 configured for maintaining network state information. The rules/filter engine 106 may process the received virtualization related information by applying algorithms in conjunction with the rules and state information supplied by the rules 116 and state 114 databases. In some embodiments, the rules/filter engine 106 may determine a set of network virtualization related data based on the processed virtualization related information. For example, the rules/filter engine 106 may be able to detect a characteristic pattern in the processed virtualization related information, and the pattern may indicate an upcoming network overload. The rules/filter engine 106 may then determine or generate a network virtualization operation based on the detected pattern, and advises a virtualization orchestrator to take actions to compensate for the upcoming network overload.

In some embodiments, the determined set of network virtualization related data may be directed to a virtualization orchestrator via interface plugins. For example, at step 2, the determined network virtualization related data set may be first directed to a Tekelec orchestration plugin 120 configured for bi-directional communication between the NFV information concentrator 102 and the Cloud XG virtualization orchestrator 104.

The Cloud XG virtualization orchestrator 104 may receive the determined network virtualization related data set via an interface module of its own. For example, at step 3 and 4, an events I/F module 122 may transmit the virtualization operation from the Tekelec orchestration plugin 120 to the rules engine 132 of the Cloud XG orchestrator 104. The events I/F module 122 may be configured as a bi-directional interface supplying analytic data and network virtualization related data sets to the Cloud XG virtualization orchestrator 104, and direct messages such as network coordination commands back to the NFV information concentrator 102. For example in steps 5, 6, and 7, the rules engine 132 of the Cloud XG virtualization orchestrator 104 may direct a network coordination command back to the rules/filter engine 106 of the NFV information concentrator 102.

Figure 4:
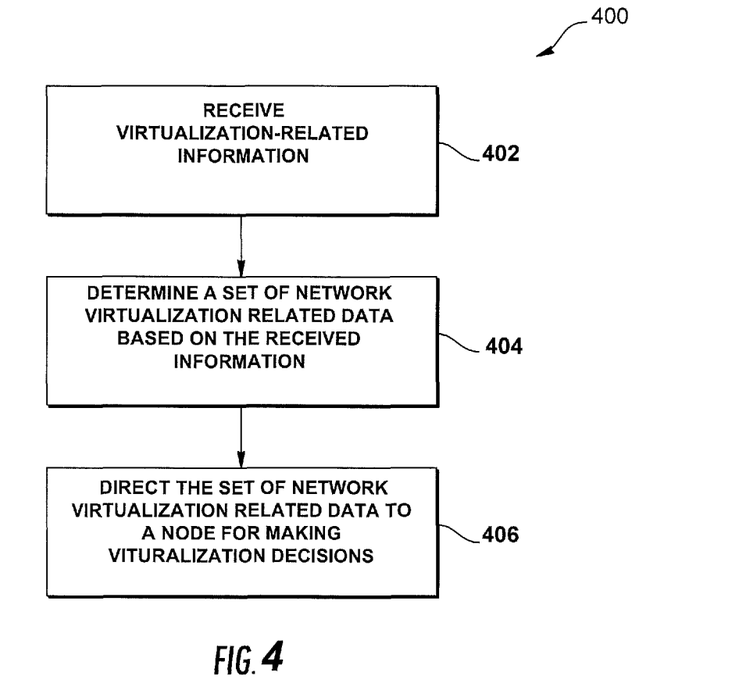
FIG. 4 is a flow chart illustrating an exemplary process for analyzing virtualization related information of a telecommunications network according to an embodiment of the subject matter described herein.

FIG. 4 is a flow chart depicting an exemplary method, generally designated 400, for analyzing virtualization related information related to a telecommunication network for managing network virtualization according to an embodiment of the subject matter described herein. Referring to FIG. 4, in block 402, virtualization related information may be received by the NFV information concentrator 102. In some embodiments, a PCRF plugin 108 may be configured to supply network performance indicators such as network load information and network traffic queue depth. Similarly, a vCloud plugin 110 may be configured to direct cloud management information such as processor load on virtue machines to the NFV information concentrator 102. The information concentrator 102 may also receive network information from other cloud networks via plugin modules such as an Amazon Web Services (AWS) plugin 112.

In some embodiments, the received virtualization related information may be analyzed and/or processed by the NFV information concentrator 102. For example, the information concentrator 102 may include a rules/filter engine 106, and the rules/filter engine 106 may be implemented with algorithms for processing received virtualization related information. Furthermore, the rules/filter engine 106 may be in communication with a rules database 116 configured for storing network virtualization operation rules, and/or a state database 114 configured for maintaining network state information. The rules/filter engine 106 may process the received virtualization related information by applying algorithms in conjunction with the rules and state information supplied by the rules 116 and state 114 databases.

In some embodiments, the rules/filter engine 106 may determine a set of network virtualization related data based on the processed virtualization related information, as shown in block 404. For example, the rules/filter engine 106 may be able to detect a characteristic pattern in the processed virtualization related information, and the pattern may indicate an upcoming network overload. The rules/filter engine 106 may then determine or generate a network virtualization operation based on the detected pattern, and advises a virtualization orchestrator to take actions to compensate for the upcoming network overload.

In block 406, the determined network virtualization operation may be directed to a virtualization orchestrator 104. In some embodiments, the NFV information concentrator 102 may have an interface plugin module configured for transmission of the network virtualization operation to the virtualization orchestrator 104. For example, a Tekelec orchestration plugin module 120 in the NFV information concentrator 102 may be configured as a bi-directional communication module to the virtualization orchestrator 104. The Tekelec orchestration plugin 120 can transmit network virtualization operations to the virtualization orchestrator 104, and in return bring back network topology information to the information concentrator 102.

While the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for analyzing information related to a telecommunications network for managing network virtualization, the method comprising:
   at an information concentrator comprising a hardware processor and for collecting and analyzing virtualization related information:
      receiving information from a plurality of computer information sources, including receiving network performance indicators for the telecommunications network from a policy and charging rules function (PCRF) plugin and network management information for the telecommunications network from a different computer information source;
      determining, for a distributed computing system executing a plurality of telecommunications nodes in a virtualized environment for implementing a telecommunications network, a set of network virtualization related data based on the received information, wherein the plurality of telecommunications nodes includes a PCRF node for communicating with the PCRF plugin; and
      directing the set of network virtualization related data to a node for making virtualization decisions for the distributed computing system executing the plurality of telecommunications nodes.

2. The method of claim 1 wherein directing the set of network virtualization related data to a node for making virtualization decisions comprises directing the data to at least one of:
   a virtualization orchestrator;
   a network orchestrator;
   an application level orchestrator;
   a network function virtualization orchestrator;
   a cloud orchestrator;
   a service orchestrator; and
   a policy function.

3. The method of claim 1 wherein receiving information comprises receiving information via a plugin module for receiving virtualization related information.

4. The method of claim 3 wherein receiving information includes receiving at least one of:
   system performance indicators;
   cloud management information; and
   information related to external networks.

5. The method of claim 1 wherein directing the set of network virtualization related data comprises directing the set of network virtualization related data to an orchestration plugin for bi-directional communication between the information concentrator and the node for making virtualization decisions.

6. The method of claim 1 wherein determining a set of network virtualization related data comprises analyzing the received information and identifying a network virtualization operation.

7. The method of claim 6 wherein analyzing the received information comprises at least one of:
   filtering the received information;
   applying an algorithm to the received information; and
   detecting a trend or pattern within the received information.

8. The method of claim 1 wherein determining a set of network virtualization related data comprises using information from at least one of:
   a rules database for providing network virtualization operation rules; and
   a state database for maintaining network state information.

9. The method of claim 1 wherein receiving information comprises receiving at least one of:
   information about the telecommunications network;
   information about another telecommunications network;
   information about an entity that is not a telecommunications network; and
   information about conditions or events that affect subscribers of the telecommunications network.

10. The method of claim 1 wherein the set of network virtualization related data comprises at least one of:
   information related to assigning at least one additional network resource to a network component;
   information related to removing at least one network resource from a network component;
   information about a trend in network resource usage or requirements;
   information about predicting future network resource usage or requirements; and
   information about providing notification of an emergency condition.

11. A system for analyzing information related to a telecommunications network for managing network virtualization, the system comprising:
   an information concentrator for analyzing information related to a telecommunications network, the information concentrator comprising:
      a first interface for receiving the information from a plurality of computer information sources, including receiving network performance indicators for the telecommunications network from a policy and charging rules function (PCRF) plugin and network management information for the telecommunications network from a different computer information source; and
      an analysis engine for collecting and analyzing the received information, for determining, for a distributed computing system executing a plurality of telecommunications nodes in a virtualized environment for implementing the telecommunications network, a set of network virtualization related data based on the information, and for directing the network virtualization related data set to a node for making virtualization decisions for the distributed computing system executing the plurality of telecommunications nodes, wherein the plurality of telecommunications nodes includes a PCRF node for communicating with the PCRF plugin.

12. The system of claim 11 wherein the node for making virtualization decisions comprises at least one of:
a virtualization orchestrator;
a network orchestrator;
an application level orchestrator;
a network function virtualization orchestrator;
a cloud orchestrator;
a service orchestrator; and
a policy function.

13. The system of claim 11 wherein the first interface comprises a first plugin module.

14. The system of claim 13 wherein the first plugin module is configured to receive at least one of:
system performance indicators;
cloud management information; and
network information from external telecommunications networks.

15. The system of claim 11 wherein the information concentrator includes a second interface for directing the determined set of network virtualization related data to a virtualization orchestrator.

16. The system of claim 15 wherein the second interface comprises a orchestration plugin configured for bi-directional communication between the information concentrator and the virtualization orchestrator.

17. The system of claim 11 wherein the information related to the telecommunications network comprises at least one of:
information about the telecommunications network;
information about another telecommunications network;
information about an entity that is not a telecommunications network; and
information about conditions or events that affect subscribers of the telecommunications network.

18. The system of claim 11 wherein the analysis engine is configured to communicate with at least one of:
a rules database for providing network virtualization operation rules; and
a state database for maintaining network state information.

19. The system of claim 11 wherein the set of network virtualization related data comprises at least one of:
assigning at least one additional network resource to a network component;
removing at least one network resource from a network component;
identifying a trend in network resource usage or requirements;
predicting future network resource usage or requirements; and
providing notification of an emergency condition.

20. A non-transitory computer readable medium having stored thereon computer executable instructions embodied in a computer readable medium and when executed by a processor of a computer performs steps comprising:
at an information concentrator comprising a hardware processor and for collecting and analyzing virtualization related information:
receiving information from a plurality of computer information sources, including receiving network performance indicators for the telecommunications network from a policy and charging rules function (PCRF) plugin and network management information for the telecommunications network from a different computer information source;
determining, for a distributed computing system executing a plurality of telecommunications nodes in a virtualized environment for implementing a telecommunications network, a set of network virtualization related data based on the received information, wherein the plurality of telecommunications nodes includes a PCRF node for communicating with the PCRF plugin; and
directing the set of network virtualization related data to a node for making virtualization decisions for the distributed computing system executing the plurality of telecommunications nodes.

* * * * *

UNITED STATES PATENT AND TRADEMARK OFFICE
CERTIFICATE OF CORRECTION

| | |
|---|---|
| PATENT NO. | : 9,838,483 B2 |
| APPLICATION NO. | : 14/086950 |
| DATED | : December 5, 2017 |
| INVENTOR(S) | : McMurry et al. |

It is certified that error appears in the above-identified patent and that said Letters Patent is hereby corrected as shown below:

On the Title Page

On page 4, Column 1, under Other Publications, Line 16, delete "regaridng" and insert -- regarding --, therefor.

In the Drawings

On sheet 1 of 4, in FIG. 1, under Reference Numeral 106, Line 1, delete "RULERS/" and insert -- RULES/ --, therefor.

On sheet 1 of 4, in FIG. 1, under Reference Numeral 108, Line 2, delete "PLUNGIN" and insert -- PLUGIN --, therefor.

On sheet 4 of 4, in FIG. 4, under Reference Numeral 406, Line 4, delete "VITURALIZATION" and insert -- VIRTUALIZATION --, therefor.

Signed and Sealed this
Tenth Day of July, 2018

Andrei Iancu
*Director of the United States Patent and Trademark Office*